(12) United States Patent
Kim et al.

(10) Patent No.: US 8,637,186 B2
(45) Date of Patent: Jan. 28, 2014

(54) ELECTRODE FOR BATTERY AND METHOD FOR MANUFACTURING THEREOF

(75) Inventors: Won-Bae Kim, Gwangju (KR); Gun-Young Jung, Gwangju (KR); Sang-Hoon Nam, Gwangju (KR); Ki-Seok Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 0 days.

(21) Appl. No.: 13/326,796

(22) Filed: Dec. 15, 2011

(65) Prior Publication Data

US 2013/0052532 A1 Feb. 28, 2013

Related U.S. Application Data

(60) Provisional application No. 61/526,928, filed on Aug. 24, 2011.

(51) Int. Cl.
*H01M 4/00* (2006.01)

(52) U.S. Cl.
USPC ........................................ 429/218.1; 429/301

(58) Field of Classification Search
USPC ................... 429/218.1, 302; 216/13; 977/948
See application file for complete search history.

(56) References Cited

U.S. PATENT DOCUMENTS

| 2005/0156180 A1* | 7/2005 | Zhang et al. ................... 257/79 |
| 2007/0281216 A1* | 12/2007 | Petrat et al. ................... 429/324 |
| 2009/0315017 A1* | 12/2009 | Song ............................... 257/24 |
| 2012/0052415 A1* | 3/2012 | Fragala et al. ..................... 430/2 |
| 2013/0020297 A1* | 1/2013 | Gupta et al. ............. 219/121.72 |

OTHER PUBLICATIONS

"Maximum Li Storage in Si Nanowires for the High Capacity Three-Dimensional Li-ion Battery" Kibum Kang et al.; Applied Physics Letters 96; 0531100; (2010) doi; 10.1063/1.3299006.
"Solution-Grown Silicon Nanowires for Lithium-Ion Battery Anodes" Canace K. Chan et al.; American Checmical Society (2010); vol. 4; No. 3; pp. 1443-1450.
"Arrays of Sealed Silicon Nanotubes as Anodes for Lithium Ion Batteries" Taeseup Song et al.; American Chemical Society (2010); doi: 10,1021/nl100086e; pp. 1710-1716.
"Silicon Nanotube Battery Anodes" Mi-Hee Park et al.; American Chemical Society (2009); vol. 9; No. 11; pp. 3844-3847.
"Structural Changes in Silicon Anodes during Lithium Insertion/ Extraction" M.N. Obrovac et al.; Electrochemical and Solid-State Letters(2004), vol. 7; No. 5; pp. A93-A96.
"All-Solid Lithium Electrods with Mixed-Conductor Matrix" B.A. Boukamp et al.; Electrochemical Science and Technology (1981); vol. 128; No. 4; pp. 725-729.

(Continued)

*Primary Examiner* — Mark F Huff
*Assistant Examiner* — Monique Wills
(74) *Attorney, Agent, or Firm* — Osha Liang LLP

(57) ABSTRACT

An electrode for a battery and a method for manufacturing the same are disclosed. The electrode for a battery according to the present invention comprising silicon nanostructures integrally formed on a silicon thin film and having a period array can reduce the internal resistance, have better charge transport properties, and reduce the structural stress, thereby exhibiting high storage capacity, high efficiency charge/discharge characteristics, and long charge/discharge cycle characteristics. Moreover, the method for manufacturing the electrode for a battery according to the present invention can simply and easily form a nanopattern with nanostructures on a silicon thin film using laser interference lithography (LIL) and dry etching.

10 Claims, 18 Drawing Sheets

(56) References Cited

OTHER PUBLICATIONS

"Amorphous Silicon as a Possible Anode Material for Li-ion Batteries" S. Bourderau et al.; Journal of Power Sources (1999); 81-82; pp. 233-236.

"High Capacity and Long Cycle Life Silicon Anode for Li-ion Battery" TsutomuTakamura et al.; Journal of Power Sources (2006); 158; pp. 1401-1404.

"High-Performance Lithium Battery Anodes Using Silicon Nanowires" Candace K. Chan et al.; Nature Nanotechnology; vol. 3; Jan. 2008; pp. 31-35.

Office Action issued in corresponding Korean Application No. 10-2011-0138229 dated May 29, 2013 (8 pages).

"Probing the Lithium Ion Storage Properties of Positively and Negatively Carved Silicon" Nam et al.; American Chemical Society 2011; vol. 11, pp. 3656-3662.

\* cited by examiner

ELECTRODE FOR BATTERY AND METHOD FOR MANUFACTURING THEREOF

CROSS-REFERENCE TO RELATED APPLICATION

This application claims priority under 35 U.S.C. §119(e) to U.S. Patent Application No. 61/526,928 filed on Aug. 24, 2011, which is herein incorporated by reference in its entirety.

BACKGROUND OF THE INVENTION

1. Field of the Invention

The present invention relates to an electrode for a battery and a method for manufacturing thereof and, more particularly, to a silicon electrode for a battery, which comprises periodically arrayed nanostructures that contribute to the improvement of battery life and capacity, and a method for manufacturing thereof, which can simply and easily form a nanopattern with nanostructures on a silicon thin film using laser interference lithography (LIL) and dry etching.

2. Description of the Related Art

As the use of portable electronic devices has increased due to the development of science and technology, the demand for secondary batteries which can be used through repeated charging and discharging has increased rapidly. Among them, a lithium secondary battery has attracted much attention due to its high voltage and high energy density.

The lithium secondary battery comprises a cathode, an anode, an electrolyte, a separator, an exterior material, etc. The cathode is configured in such a manner that a mixture of a cathode active material, a conductive material, a binder, etc. is applied to a current collector. Lithium-transition metal composite oxides such as $LiCoO_2$, etc. are mainly used as cathode active materials. Carbonaceous materials such as carbon, graphite, etc. which have a relatively low potential, are typically used as anode active materials. However, the carbonaceous materials have a theoretical capacity of about 372 mAh $g^{-1}$, and thus the development of new anode active materials is required to increase the capacity of the battery.

Meanwhile, silicon is attracting increasing attention as a next-generation electrode material which can replace the carbonaceous materials and can be used as an anode of a Li-ion secondary battery. The silicon has advantages of high theoretical capacity that is about 10 times higher than the carbonaceous materials (4200 mAh g-1), relatively low working potential (~0.5 V vs. $Li/Li^+$), and very high energy storage density. However, despite these advantages, an electrode using silicon has the problem of large volume change of approximately 400% occurring during Li-Si alloying/dealloying. The electrode using silicon undergoes significant structural stress due to repeated volume changes through continuous charge/discharge and thus is mechanically very unstable. Therefore, cracks occur or part of the electrode is detached from the current collector. Moreover, the cracked portion reduces the electrical contact between particles, which increases the contact resistance. In the part of the electrode detached from the current collector, lithium ions are isolated and do not participate in the electrode reaction any longer, thereby reducing the cycle performance.

Recently, extensive research aimed at synthesizing silicon in the form of nanowires or nanotubes has continued to progress to solve the above problems [Chan, C. K.; Peng, H.; Liu, G.; McIlwarth, K.; Zhang, X. F.; Huggins, R. A.; Cui, Y. *Nat. Nanotechnol.* 2008, 3, 31., Song, T.; Xia, J.; Lee, J.-H.; Lee, D. H.; Kwon, M.-S.; Choi, J.-M.; Wu, J. Doo, S. K.; Chang, H.; Park, W. I.; Zang, D. S.; Kim, H.; Huang, Y.; Hwang, K.-C.; Rogers, J. A.; Paik, U. *Nano Lett.* 2010, 10, 1710. etc.]. However, most of the silicon nanowires or nanotubes are grown or deposited to have a non-periodic array, and thus there are structural limitations. Moreover, the silicon nanowires or nanotubes are prepared by various bottom-up methods in which they are formed by growth from a thin film, and thus there are disadvantages to the process such as the complexity of the manufacturing process, an increase in the manufacturing process, etc.

SUMMARY OF THE INVENTION

Therefore, a first object of the present invention is to provide an electrode for a battery, which comprises periodically arrayed nanostructures with a desired shape formed on a silicon thin film to have long charge/discharge cycle characteristics and high capacity and high efficiency characteristics.

Moreover, a second object of the present invention is to provide a method for manufacturing an electrode for a battery, which can simply and easily form a nanopattern with nanostructures on a silicon thin film using laser interference lithography (LIL) and dry etching.

According to an aspect of the present invention to achieve the first object, there is provided an electrode for a battery, the electrode comprising: a silicon thin film; and silicon nanostructures integrally formed on the top of the silicon thin film and having a periodic array.

According to another aspect of the present invention to achieve the second object, there is provided a method for manufacturing an electrode for a battery, the method comprising: forming a photoresist layer on a silicon thin film formed on a substrate; exposing the photoresist layer to light formed interference pattern; forming a photoresist pattern by developing the exposed photoresist layer; and forming nanostructures on the silicon thin film by etching the silicon thin film using the photoresist pattern as a mask.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
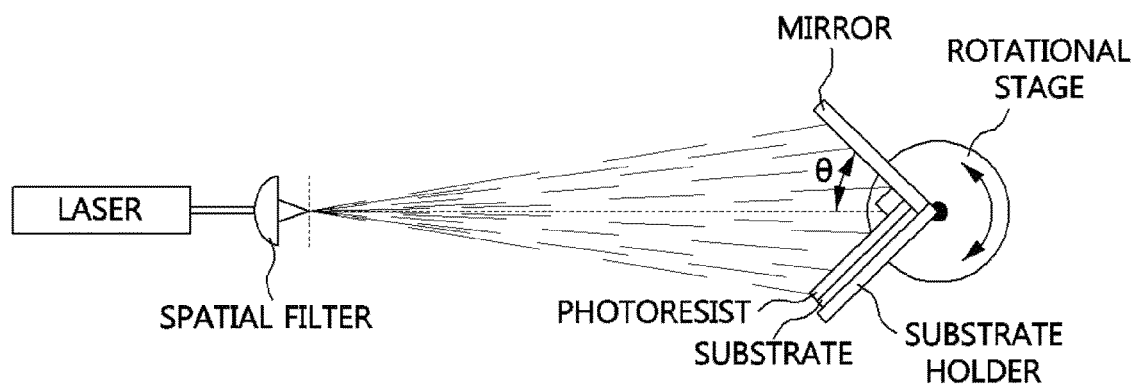
FIG. 1 is a schematic diagram of a laser interference system.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Unless otherwise defined, all terms, including technical and scientific terms, used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

An electrode for a battery according to the present invention comprises a silicon thin film and silicon nanostructures integrally formed on the silicon thin film. The silicon thin film may be crystalline or amorphous. Here, it is more preferable to use amorphous silicon to exhibit better electrochemical performance. The silicon thin film may have a thickness of about 100 to 1,000 nm.

The silicon nanostructures are integrally formed on the silicon thin film. The silicon nanostructures on the silicon thin film may have a positive or negative pattern formed by etching the silicon thin film. The silicon nanostructures may be periodically arrayed or formed with a desired shape.

The silicon nanostructures may be a plurality of silicon pillars periodically arrayed at regular intervals. The distance between adjacent silicon pillars and the diameter of each silicon pillar may preferably be 10 to 300 nm. If the distance and the diameter are less than 10 nm, the actual implementation is difficult to achieve, whereas, if the distance and the diameter exceeds 300 nm, the silicon thin film exhibits characteristics similar to a silicon thin film without the nanostructures.

Moreover, the silicon nanostructures may be a plurality of silicon wells periodically formed at regular intervals. The distance between adjacent silicon wells and the diameter of each silicon well may preferably be 10 to 300 nm. If the distance and the diameter are less than 10 nm, the actual implementation is difficult to achieve, whereas, if the distance and the diameter exceeds 300 nm, the silicon thin film exhibits characteristics similar to a silicon thin film without the nanostructures.

Here, the silicon nanostructures may have a 4-fold symmetric array structure, in which the diameter of each of the plurality of periodically arrayed silicon pillars or that of each of the plurality of periodically formed silicon wells is the same as the distance between adjacent silicon pillars or silicon wells. Moreover, the height of the silicon pillar and the depth of the silicon well may preferably be 50 to 1,000 nm. The depth of the silicon well may have a value smaller than or equal to the thickness of the silicon thin film. Here, if the thickness of the silicon thin film is equal to the depth of the silicon well, the electrode of the present invention may comprise only the silicon nanostructures without the silicon thin film.

The periodically arrayed nanostructures integrally formed on the silicon thin film serve to cause Li-ion diffusion of the electrolyte in an open space between adjacent nanostructures during electrochemical reaction, thereby ensuring an enlarged active site. The enlarged active site reduces the internal resistance and the volume change during charge/discharge cycles, thereby contributing to stress relaxation. Moreover, the silicon nanostructures provide an extended surface area and form nanocavities therein to provide extra contact area to the electrolyte, thereby facilitating the transport of lithium ions.

Meanwhile, a method for manufacturing the electrode for a battery according to the present invention comprises forming a photoresist layer on a silicon thin film formed on a substrate, exposing the photoresist layer to light formed interference pattern, forming a photoresist pattern by developing the exposed photoresist layer, and forming nanostructures on the silicon thin film by etching the silicon thin film using the photoresist pattern as a mask. The exposing of the photoresist layer to light is performed by laser interference lithography, and the etching is performed by dry etching.

Laser interference lithography (LIL) technique is a method in which at least two coherent beams intersect to form an interference pattern and the interference pattern is exposed to light and developed by a physical or chemical method, thereby forming a nanopattern.

Then, an etching process is performed to form nanostructures with a desired shape on the thin film. The LIL technique can form nanostructures without mask and easily form nanopatterns with various sizes and shapes by controlling the arrangement of section of a laser interference system. Moreover, the limitations are not imposed by the diffraction of light, and thus it is possible to form a nanopattern of less than 100 nm. Furthermore, the LIL technique provides several advantages such as easy processing, large-area patterning, and simple adjustment of the density or diameter of desired nanostructures.

FIG. 1 is a schematic diagram of a laser interference system.

Referring to FIG. 1, a beam emitted from a laser is expanded through a spatial filter. Then, half of the expanded beam is directly irradiated onto a substrate coated with a photoresist, and the remaining half of the expanded beam is reflected by a mirror and irradiated onto the substrate. Therefore, two beams intersect to form an interference pattern on the substrate and the interference pattern is exposed to the photoresist. At this time, it is possible to easily change the angle of the irradiated beam by rotating a substrate holder disposed at the bottom of the substrate, and thus it is possible to facilitate the adjustment of the periodicity of the pattern formed in the above manner.

FIGS. 2A to 2D are process diagrams showing a method for manufacturing an electrode for a battery in accordance with an exemplary embodiment of the present invention, and FIGS. 3A to 3D are process diagrams showing a method for manufacturing an electrode for a battery in accordance with another exemplary embodiment of the present invention.

Figure 2A:
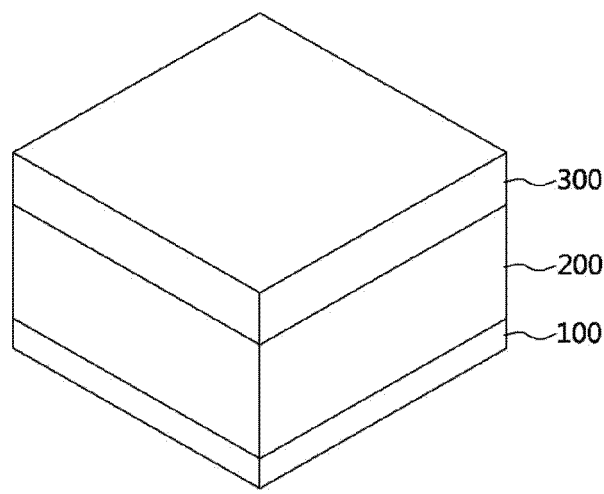
FIGS. 2A to 2D are process diagrams showing a method for manufacturing an electrode for a battery in accordance with an exemplary embodiment of the present invention.
Figure 3A:
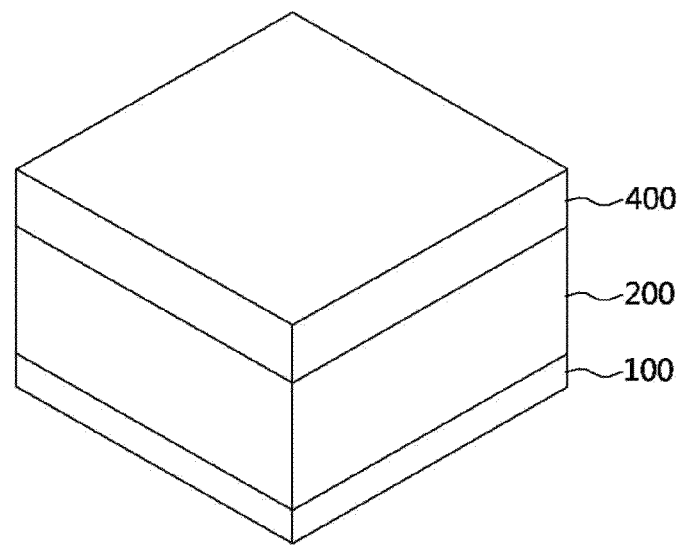
FIGS. 3A to 3D are process diagrams showing a method for manufacturing an electrode for a battery in accordance with another exemplary embodiment of the present invention.

Referring to FIGS. 2A and 3A, a silicon thin film 200 is formed on a substrate 100. The substrate 100 serves as a support of the silicon thin film 200 and may be eliminated depending on the use. For example, the substrate 100 may be a stainless steel substrate containing chrome or nickel, but not limited thereto. The silicon thin film 200 formed on the substrate 100 may be crystalline or amorphous silicon. Here, it is more preferable to use amorphous silicon to exhibit better electrochemical performance. The silicon thin film 200 may be formed with a thickness of about 100 to 1,000 nm by various methods such as sputtering, radio-frequency (RF) magnetron sputtering, spin coating, dip coating, etc.

Before forming a photoresist layer 300 or 400, an adhesion promoter layer (not shown) may be further formed on the silicon thin film 200. An oxide layer naturally formed when the silicon thin film 200 is exposed to air reacts with moisture in the air to form a polar OH— bonding group, which imparts hydrophilic properties to the surface of the silicon thin film 200. The hydrophilic surface reduces the adhesion with the photoresist layer 300 or 400. Thus, the adhesion promoter layer is formed to convert the surface to be hydrophobic, thereby increasing the adhesion with the photoresist layer 300 or 400. The adhesion promoter layer may be a hexamethyldisilazane ($Si_2(CH_3)_6$) film and may be formed by spin coating, for example.

The photoresist layer 300 or 400 is formed on the adhesion promoter layer. A positive (+) or negative (−) photoresist may be used for the photoresist layer 300 or 400. The positive (+) or negative (−) photoresist may be used by mixing with a solvent in predetermined volume ratio. For example, the solvent may be a thinner. The positive photoresist may form a silicon pillar during etching after the formation of a pattern, and the negative photoresist may form a silicon well.

The photoresist layer may be formed by spin coating, for example. Here, the thickness of the photoresist layer formed by spin coating depends on the speed, time, etc. of the spin coating, and a solvent may be mixed with the photoresist in a predetermined ratio to form a photoresist layer with an appropriate thickness. Then, the solvent may be removed by soft baking to increase the adhesion between the substrate and the photoresist layer.

Figure 2B:
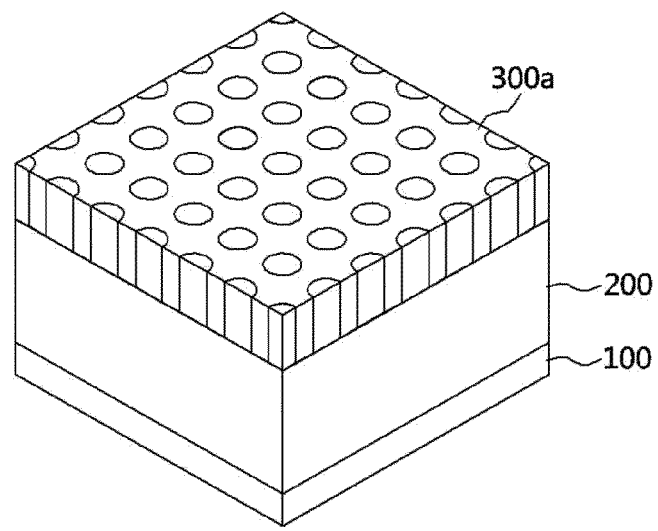
Figure 3B:
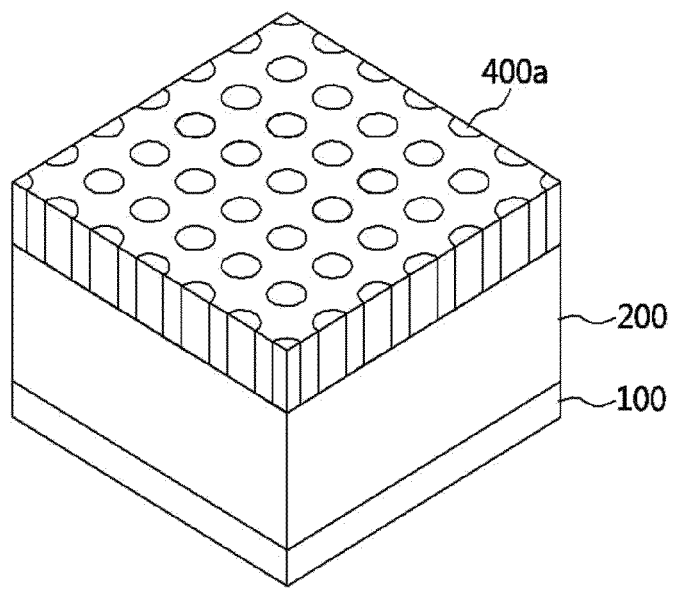

Referring to FIGS. 2B and 3B, the photoresist layer 300 or 400 is exposed to light by laser interference lithography to form an interference pattern 300a or 400a on the silicon thin film 200. A beam emitted from a laser is expanded through a spatial filter. Then, half of the expanded beam is directly irradiated onto the substrate 100 coated with the silicon thin film 200, and the remaining half of the expanded beam is reflected by a mirror and irradiated onto the substrate 100. Therefore, two beams intersect to form an interference pattern on the substrate 100 and the interference pattern is exposed to the photoresist layer 300 or 400. At this time, two highly coherent He—Cd laser beams may be used to produce a periodic interference pattern on the silicon thin film 200 coated with a positive (+) or negative (−) photoresist layer 300 or 400. The exposure may be performed in two stages. That is, after a first exposure is performed to expose a part of the silicon thin film 200 coated with the positive (+) or negative (−) photoresist layer 300 or 400 to form nanoscale parallel lines, the substrate 100 is rotated 90°, and then a second exposure is performed to produce an array pattern 300a or 400a with a 4-fold symmetric array structure. At this time, it is possible to easily change the angle of the irradiated beam by rotating a substrate holder disposed at the bottom of the substrate, and thus it is possible to facilitate the adjustment of the periodicity of the pattern formed in the above manner.

Figure 2C:
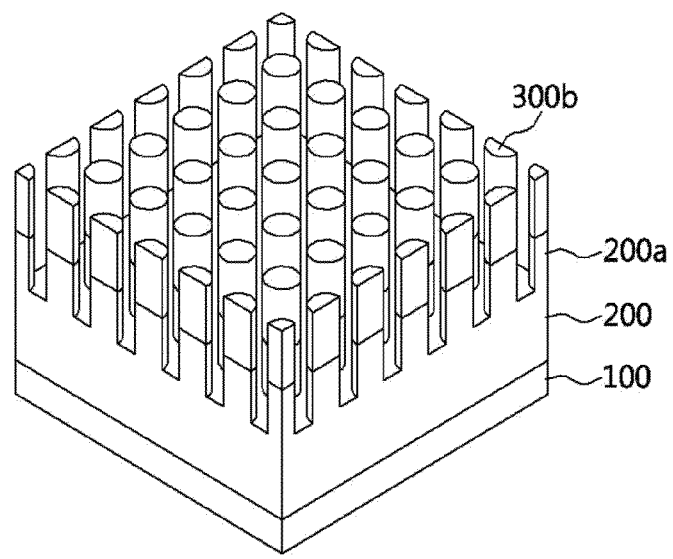
Figure 3C:
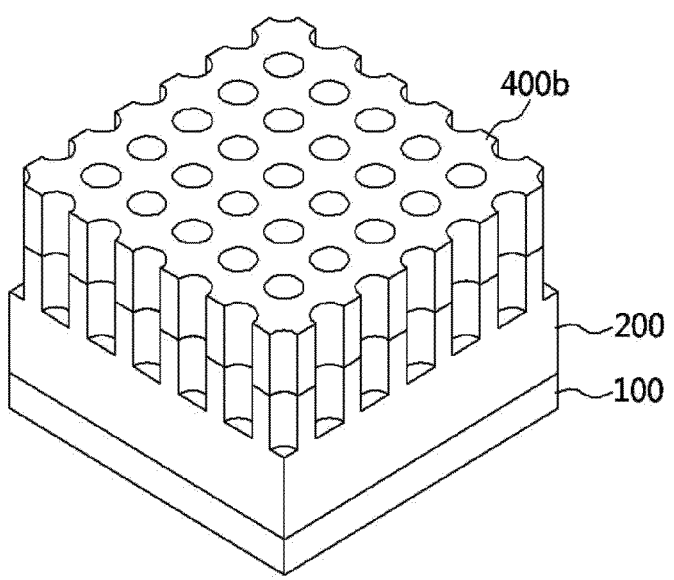

Referring to FIGS. 2C and 3C, the exposed photoresist layer is developed to form a photoresist pattern 300b or 400b on the silicon thin film 200. The photoresist pattern 300b or 400b may be a positive pattern 300b or a negative pattern 400b. The photoresist pattern 300b or 400b may be used as an etching mask during an etching process, which will be described below.

Figure 2D:
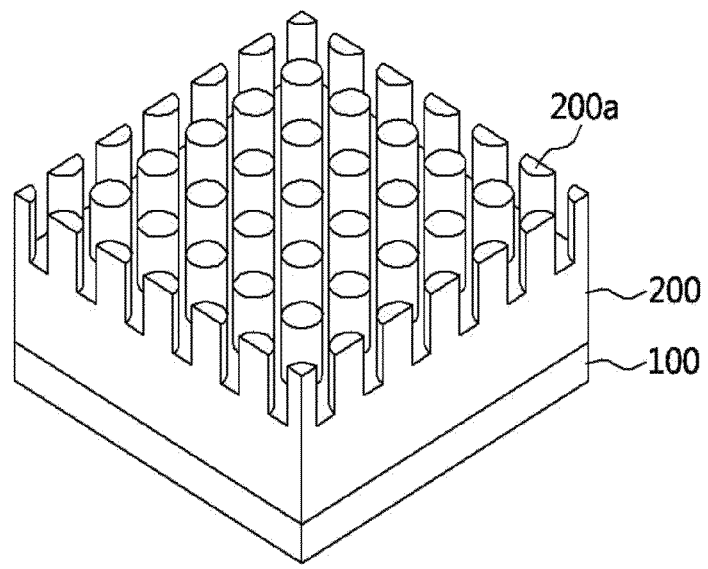
Figure 3D:
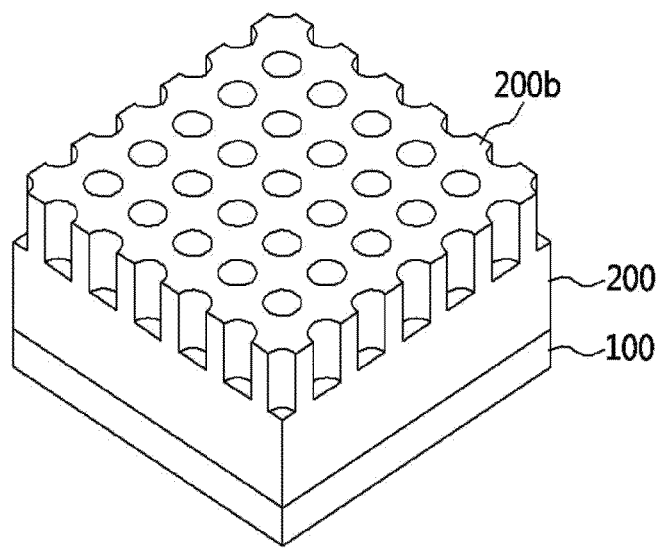

Referring to FIGS. 2D and 3D, nanostructures 200a or 200b are formed on the silicon thin film 200 by an etching process using the photoresist pattern 300b or 400b as an etching mask. The formation of the silicon nanostructures may be achieved by dry etching which can provide anisotropic etching. For example, the dry etching may be reactive ion etching (RIE).

The silicon nanostructures 200a formed by the dry etching may be a plurality of silicon pillars periodically arrayed at regular intervals. The distance between adjacent silicon pillars and the diameter of each silicon pillar may preferably be 10 to 300 nm. If the distance and the diameter are less than 10 nm, the actual implementation is difficult to achieve, whereas, if the distance and the diameter exceeds 300 nm, the silicon thin film exhibits characteristics similar to a silicon thin film without the nanostructures. Moreover, the silicon nanostructures 200b may be a plurality of silicon wells periodically formed at regular intervals. The distance between adjacent silicon wells and the diameter of each silicon well may preferably be 10 to 300 nm. If the distance and the diameter are less than 10 nm, the actual implementation is difficult to achieve, whereas, if the distance and the diameter exceeds 300 nm, the silicon thin film exhibits characteristics similar to a silicon thin film without the nanostructures. Furthermore, the height of the silicon pillar and the depth of the silicon well may preferably be 50 to 1,000 nm. The depth of the silicon well may have a value smaller than or equal to the thickness of the silicon thin film. Here, if the thickness of the silicon thin film is equal to the depth of the silicon well, the electrode of the present invention may comprise only the silicon nanostructures without the silicon thin film.

Next, preferred examples will be provided to facilitate understanding of the present invention. However, the following examples are only for the understanding of the present invention, and the present invention is not limited by the following examples.

EXAMPLES

1. Preparation of Silicon Thin Film

A Si thin-film with a 300 nm thickness was deposited on a substrate with a size of 1.77 $cm^2$ using a radio-frequency (RF) magnetron sputtering method. During the sputtering, the base pressure was less than $5 \times 10^{-6}$ Torr and the working pressure was 10 mTorr. The amount of high-purity Ar gas injected into a chamber at a predetermined pressure was fixed at 40 sccm at room temperature.

2. Formation of Nanostructures in the Form of Silicon Pillars and Silicon Wells

To form a nanopattern with a periodic array on the Si thin film, a 20 nm thick hexamethyldisilazane (HMDS, Fluka)

film was first coated on the Si thin film and then annealed at 90° C. for 2 minutes. Then, a positive (+) photoresist (AZ6612, Clariant) or negative (−) photoresist (AZ6600 series, Clariant) was mixed with a thinner (AZ1512, Clariant) in a volume ratio of 1:2, and the mixture was spin-coated on the HMDS film, thereby forming a photoresist layer. Subsequently, a He-Cd laser ($\lambda_{UV}$=325 nm, intensity=0.75 mW cm$^{-2}$) was used for laser interference lithography. That is, two highly coherent He—Cd laser beams were used to produce a periodic interference pattern on the Si thin film 200 coated with the photoresist layer. In a first exposure, a part of the Si thin film coated with the photoresist layer was exposed to form nanoscale parallel lines. After the first exposure, the Si thin film was rotated 90°, and a second exposure was performed to produce an array pattern with a 4-fold symmetric array structure. Then, the resulting Si thin film was developed using a developer (MIF500, Clariant) at room temperature for 35 seconds to remove undeveloped photoresist, and the resulting Si thin film was heated on a hot plate at 110° C. for 1 minute. Subsequently, a dry etching process was performed for 65 seconds under the conditions such as a $CHF_3$ gas mixture at 100 W and 10 mTorr, thereby forming nanostructures in the form of periodically arrayed Si pillars and Si wells, respectively. At this time, the mass of the active material on the Si thin film with the Si pillars was measured as 0.09 mg, and the mass of the active material on the Si thin film with the Si wells was measured as 0.15 mg.

SEM (Hitachi S-4800) was used to examine the morphologies of the prepared SI thin film electrodes, and XRD (Rigaku Ru-200B), TEM (JEOL S7600), and XPS (VG Multilab2000) were used to examine the characteristics of the silicon nanostructures. Moreover, a two-electrode system, in which the prepared electrode was employed as a working electrode and metallic lithium was employed as a counter electrode, was used to examine the electrochemical characteristics. At this time, a polished stainless steel disc was used as the substrate. A $LiPF_6$ solution in which ethylene carbonate and diethyl carbonate were mixed in a volume mixture of 1:1 was used as the electrolyte.

Moreover, a galvanostatic discharge/charge process at various C-rates from 0.02 C to 0.2 C was performed with a potential window of 1.5 V to 0.01 V (vs. Li/Li$^+$) using a battery cycler (WonA tech, WBCS3000). Furthermore, cyclic voltammetry was performed over a potential range of 1.5 V to 0.01 V at various scan rates of 0.05 mV s$^{-1}$, 0.1 mV s$^{-1}$, 0.2 mV s$^{-1}$, and 0.5 mV s$^{-1}$ using a Solartron 1470E multistat system.

Figure 4A:
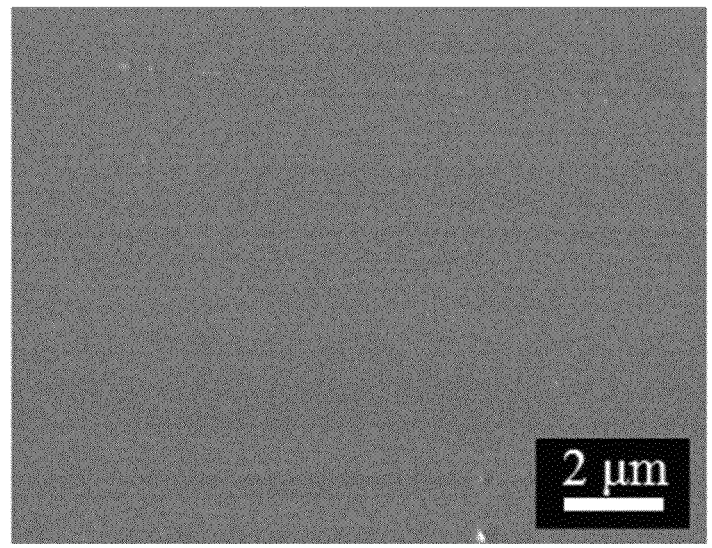
FIGS. 4A and 4B show SEM images of a silicon thin film electrode in accordance with a comparative example.
Figure 4B:
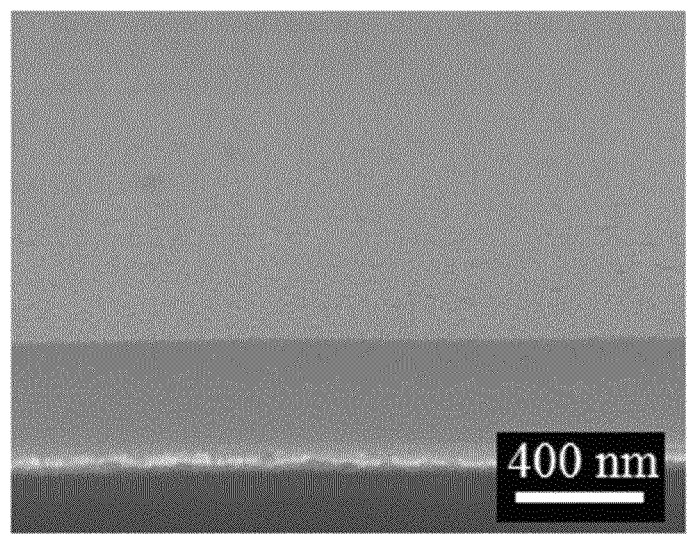
Figure 5A:
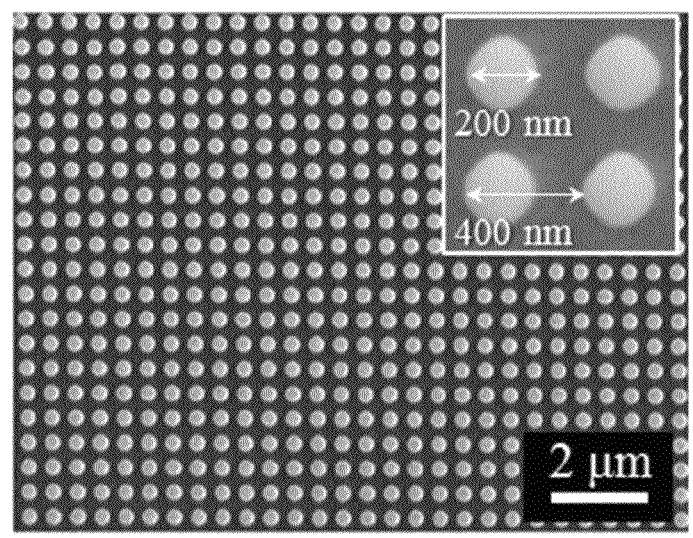
FIGS. 5A and 5B show SEM images of an electrode for a battery in accordance with an exemplary embodiment of the present invention.
Figure 5B:
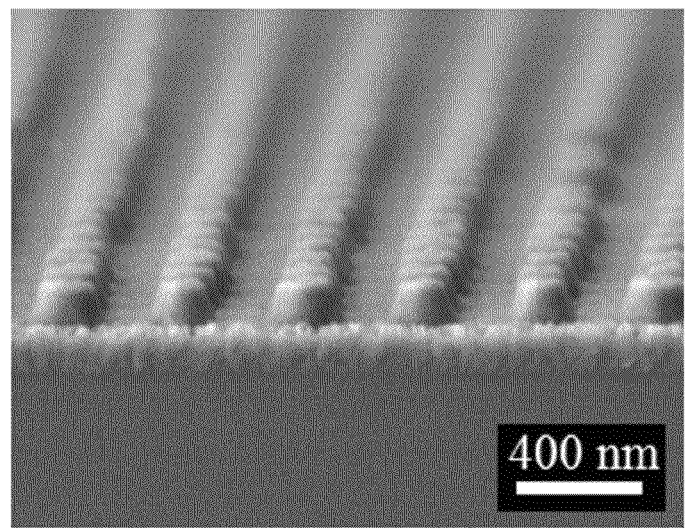
Figure 6A:
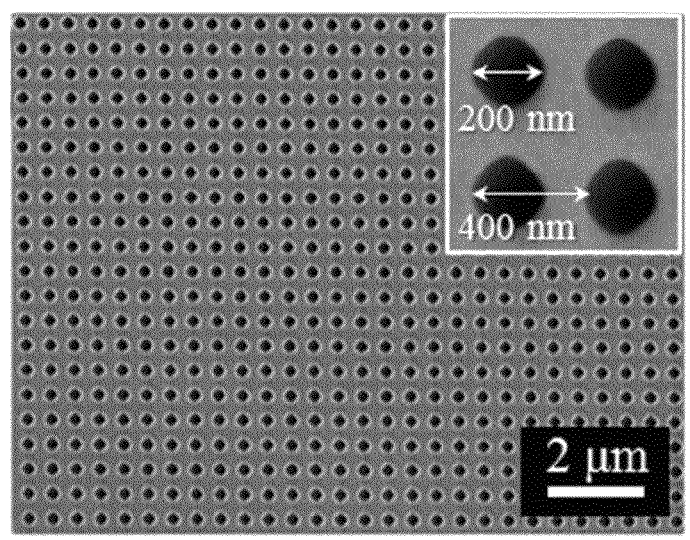
FIGS. 6A and 6B show SEM images of an electrode for a battery in accordance with another exemplary embodiment of the present invention.
Figure 6B:
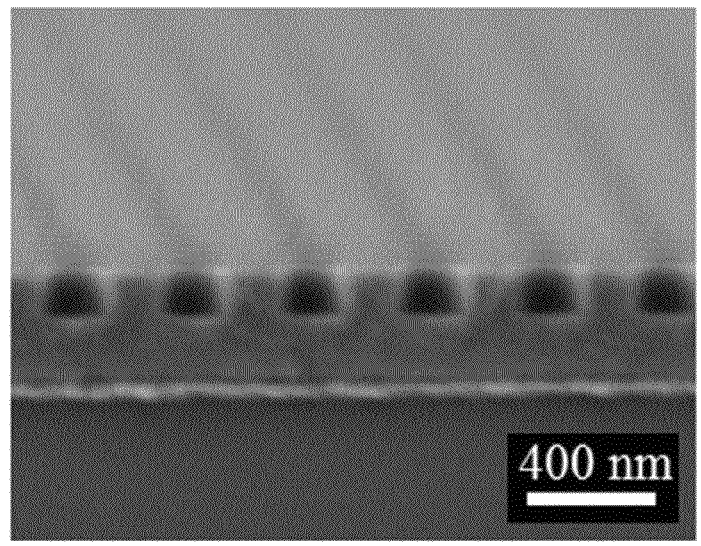

FIGS. 4A and 4B show SEM images of a silicon thin film electrode in accordance with a comparative example, FIGS. 5A and 5B show SEM images of an electrode for a battery in accordance with an exemplary embodiment of the present invention, and FIGS. 6A and 6B show SEM images of an electrode for a battery in accordance with another exemplary embodiment of the present invention.

Referring to FIGS. 4A and 4B, it can be seen that the Si thin film without the nanostructures has a smooth surface.

Referring to FIGS. 5A and 5B, it can be seen that the electrode has the periodically arrayed Si pillars formed on the Si thin film using the positive (+) photoresist. Here, it can be seen that each Si pillar has a diameter of 200 nm, the distance between adjacent Si pillars is 200 nm, and the thickness of the Si pillar is 200 nm.

Referring to FIGS. 6A and 6B, it can be seen that the electrode has the periodically arranged Si wells formed on the Si thin film using the negative (−) photoresist. Here, it can be seen that each Si well has a diameter of 200 nm, the distance between adjacent Si wells is 200 nm, and the depth of the Si well is 200 nm. $1.29 \times 10^9$ Si pillars or wells can be formed on the substrate with a size of 1.77 cm$^2$.

Figure 7A:
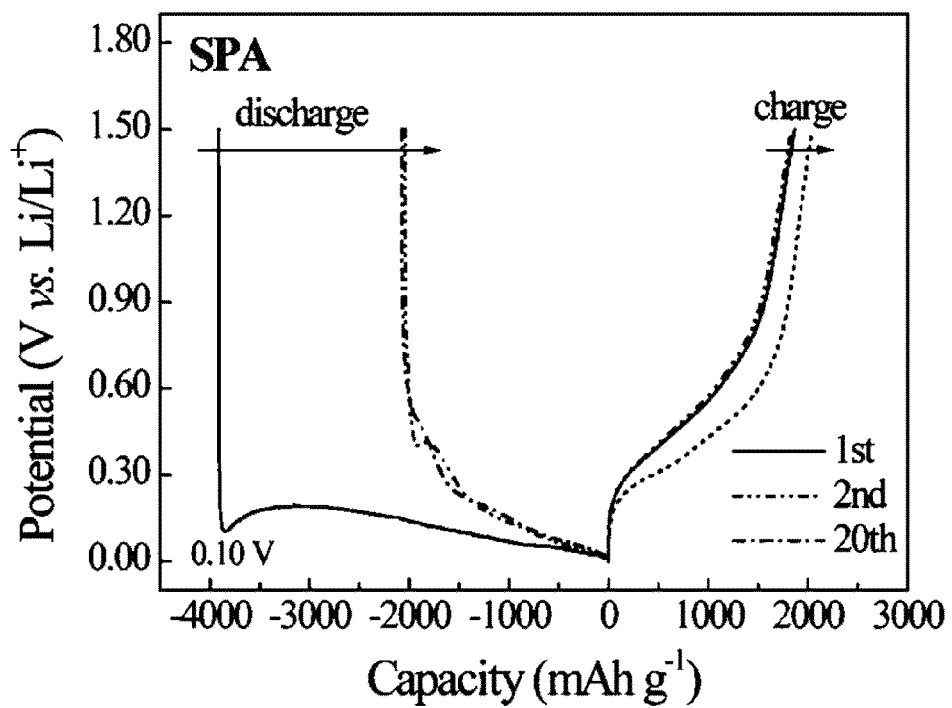
FIGS. 7A to 7C are graphs showing voltage profiles at a 0.04 C rate of the electrode for a battery in accordance with the present invention.
Figure 7B:
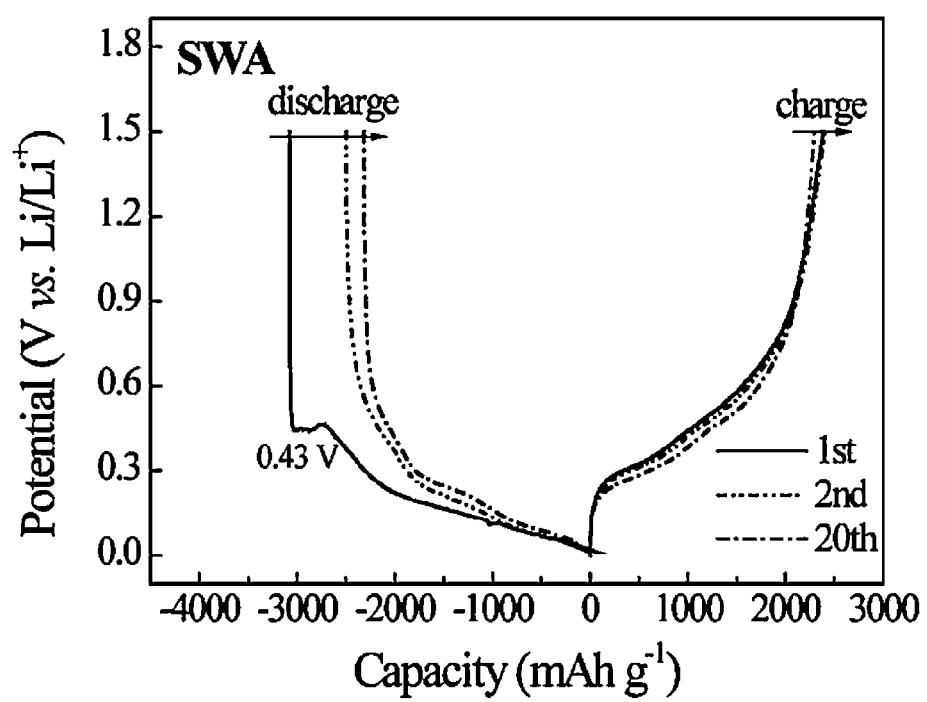
Figure 7C:
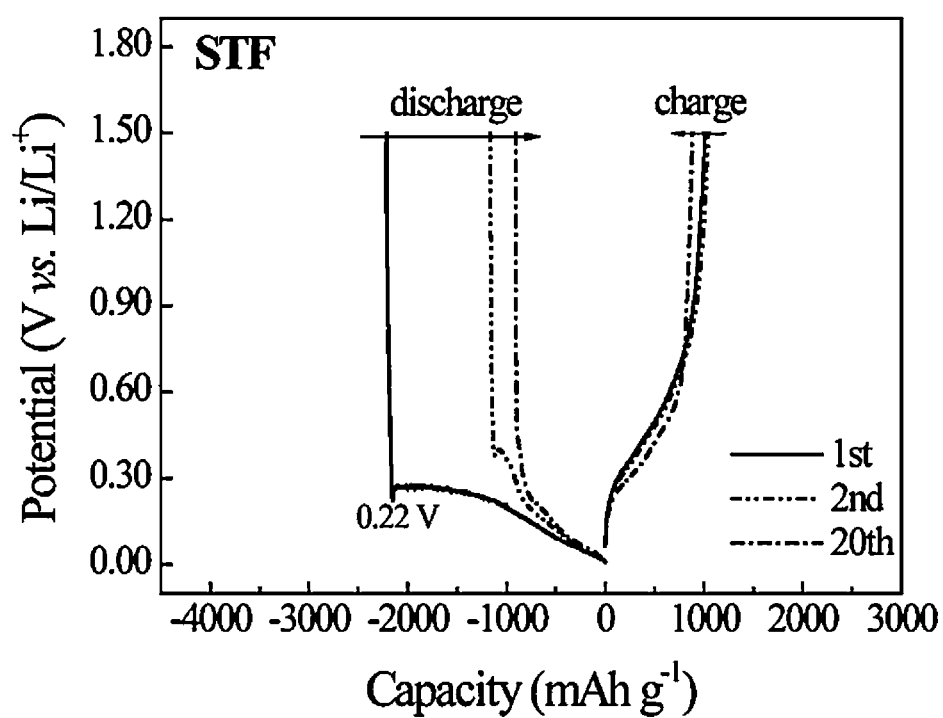

FIGS. 7A to 7C are graphs showing voltage profiles at a 0.04 C rate of the electrode for a battery in accordance with the present invention. To measure the potential of the electrode, the Si thin film with a Si pillar array (hereinafter referred to as SPA), the Si thin film with a Si well array (hereinafter referred to as SWA), and the Si thin film without the nanostructures (hereinafter referred to as STF) were inserted into a coin-type half-cell, and the Li—Si alloying/dealloying properties were investigated with the galvanostatic discharge/charge process.

Referring to FIGS. 7A to 7C, it can be seen that the potential is 0.01 V to 1.5 V at a constant C-rate of 0.04 C. The discharge capacity mainly occurs below 0.3 V, and the charge capacity appears from 0.3 V to 0.8 V. It can be seen that the voltage profiles show a plateau in the shape of "L" in the first discharge and a smoother and sloped shape after the second discharge. The irreversible voltage profile at the initial cycles seems to be associated with the formation of a solid electrolyte interface (SEI) layer, which coats the surface of the electrode, or the native oxide reduction, which is related to phase transformation, by the reaction between the electrolyte and the lithium, which is related to the Li-Si alloying/dealloying due to the repeated charge/discharge cycles.

Moreover, it can be seen that the voltage profiles at the initial cycles can be affected by the surface morphology of the electrodes. In the first discharge, the potentials of the SPA, SWA, and STF rapidly drop to the voltages of 0.10 V, 0.43 V, and 0.22 V, respectively. The potential plateau is formed around 0.2 V in the case of the SPA and STF, and then gradually decreases to 0.01 V. It can be seen that the STF shows a steeper decrease of potential from the second discharge than those of the SPA and SWA in the range 0.2-0.6 V.

The silicon electrodes can influence the capacity and energy dissipation due to plastic deformation during battery reaction. These voltage fluctuations are related to the electrochemical resistance of the silicon thin film against electrochemical reactions. Therefore, when the nanostructures are formed on the surface of the silicon thin film electrode, the active silicon can be controlled, which can lead to potential profiles and cell performances different from those of the silicon thin film without the nanostructures.

It can be seen that the reversible 20th cycle shows a distinct difference between the silicon thin films with nanostructures (SPA and SWA) and the silicon thin film without the nanostructures (STF). While the potential of the STF rapidly drops to about 0.4 V, the SPA and SWA show sluggish potential drops in the discharge process, from which it can be seen that the silicon thin films with the nanostructures (SPA and SWA) have smaller internal resistance compared to the silicon thin film without the nanostructures (STF).

Figure 8:
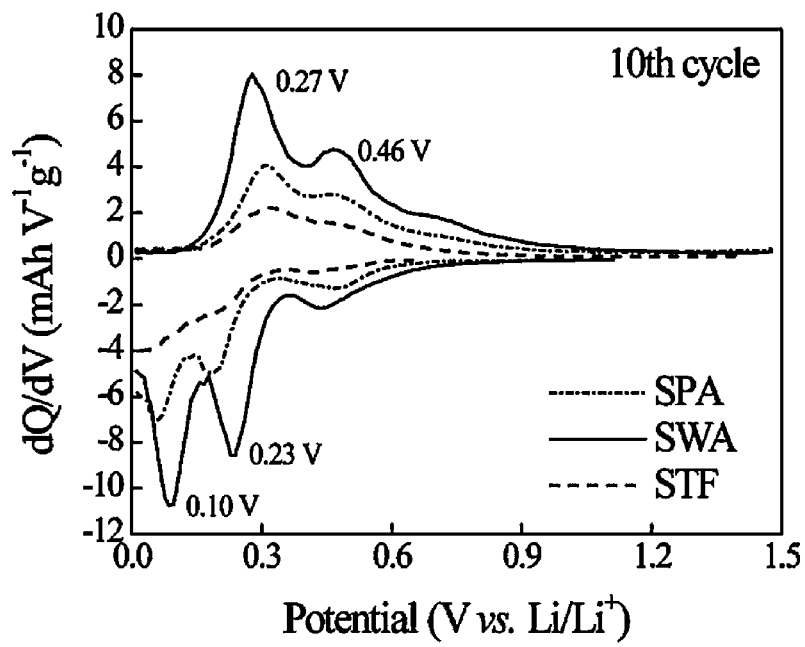
FIG. 8 is a graph showing a plot of dQ/dV vs. V calculated from different capacities at the 10th charge/discharge cycle of the electrode for a battery in accordance with the present invention.

FIG. 8 is a graph showing a plot of dQ/dV vs. V calculated from different capacities at the 10th charge/discharge cycle of the electrode for a battery in accordance with the present invention.

Referring to FIG. 8, the plot of dQ/dV vs. V calculated from different capacities shows redox reactions at the 10th cycle in terms of the positions and relative intensity of the peaks. The peaks in the graph are attributed to the potential dependence of Li—Si alloys of different compositions. Anodic peaks are present over 0.25 V and cathodic peaks are present below 0.3 V, and these are related to the alloying/dealloying in the silicon electrode alloy. In the alloying process, two cathodic peaks at around 0.23 V and 0.10 V appear in the case of the SWA, and they are associated with the formation of amorphous $Li_xSi$ phase via a single-phase transition. The appearance of the two peaks may be caused by two different sites with different energies in the electrode structures.

In the dealloying process, lithium is extracted from the amorphous $Li_xSi$, and the amorphous silicon is then formed. The constructed Si structures will be reformed when the potential reaches 0.8 V, which is consistent with the changes in the silicon electrodes after cycling, which will be described below. A decrease in the anodic-to-cathodic peak-to-peak separation is observed in the SPA and SWA with the nanostructures, compared to the STF. While the peak separations in the SWA appear at 0.15 V, the SPA and STF have a peak separation at 0.30 V. The peak separations occur at low overpotentials, and the peak positions are observed in doped Si and metal-incorporated Si. It can be seen that the SWA shows the largest peak magnitudes due to the effective integration of active Si in the alloying/dealloying process associated with the phase transition.

TABLE 1

Sheet resistance and initial voltage drop of STF, SWA, and SPA

| Sample | Sheet resistance ($\Omega/\square$) | Initial voltage drop (V) |
|---|---|---|
| STF | 3.19 | 1.28 |
| SWA | 1.75 | 1.05 |
| SPA | 3.32 | 1.40 |

One of the reasons that the silicon thin film electrode with the nanostructures has excellent electrochemical characteristics is the charge transport capability that plays an important role in the performance of the battery. As shown in Table 1, the SWA has significantly low sheet resistance and initial voltage drop. The voltage profile of the SWA exhibits a relatively low voltage drop due to a small internal resistance, from which it can be seen that the SWA has excellent electrical conductivity.

Therefore, it can be seen that the silicon thin film with the nanostructures is a better anode material with low discharge/charge voltage hysteresis than that of the silicon thin film without the nanostructures.

Figure 9:
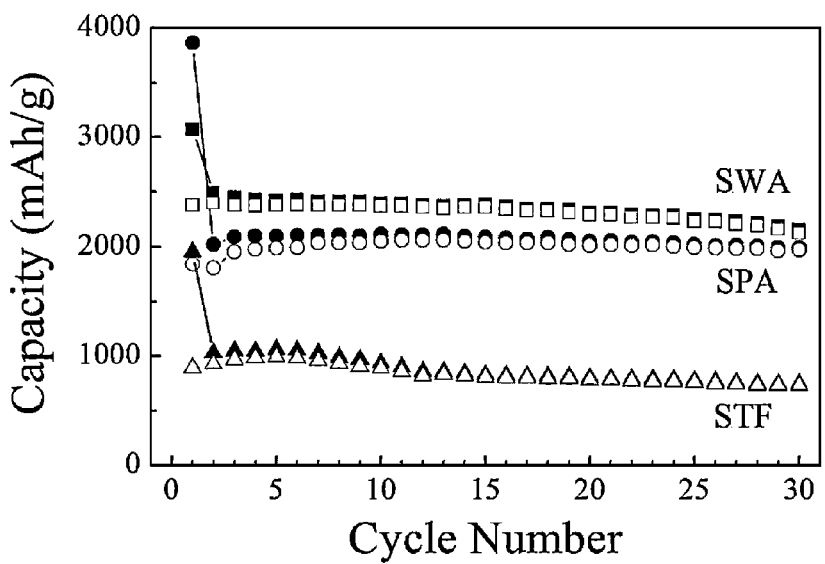
FIG. 9 is a graph showing the capacity at different cycle numbers of the electrode for a battery in accordance with the present invention.

FIG. 9 is a graph showing the capacity at different cycle numbers of the electrode for a battery in accordance with the present invention.

Referring to FIG. 9, it can be seen that the silicon electrodes with the nanostructures (SWA) shows substantially higher capacity and improved capacity retention compared to those of the electrode without the nanostructures (STF). While the SWA and SPA show small capacity fading of less than 0.4% per cycle after the 5th cycle, the STF shows 1.3% per cycle. This means that the silicon electrodes with the nanostructures have greater facile stress relaxation than the electrodes without the nanostructures, since the capacity retention is related to the film stress during charge/discharge cycles. Considering that the nanostructures are formed by etching about 50% of the total thickness of the silicon thin film, the change and improvement of the electrochemical properties of the silicon thin films with the nanostructures are caused by the remaining thin film layer because the un-etched silicon also contributes to the electrochemical performance.

Figure 10:
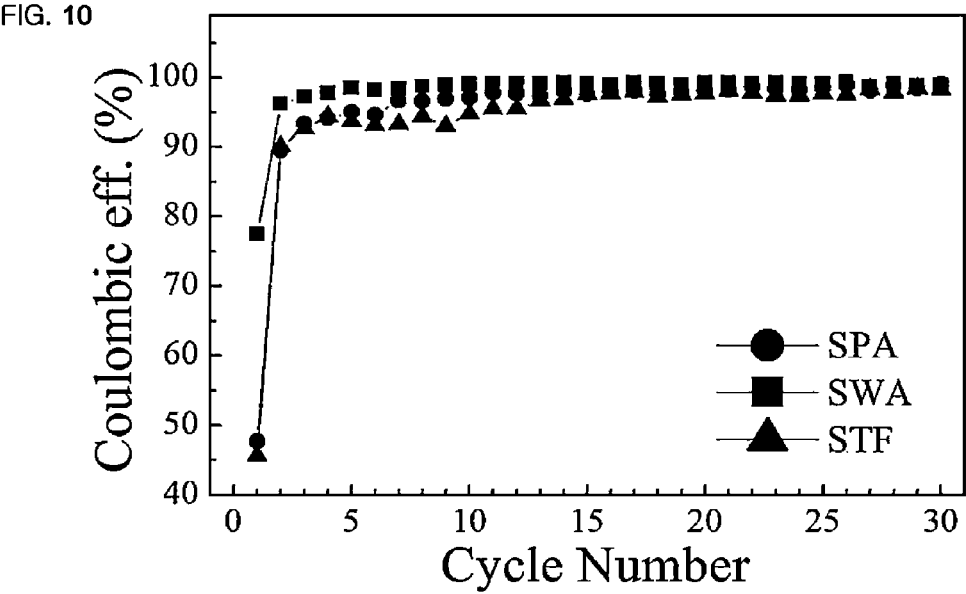
FIG. 10 is a graph showing the coulombic efficiency at different cycle numbers of the electrode for a battery in accordance with the present invention.

FIG. 10 is a graph showing the coulombic efficiency at different cycle numbers of the electrode for a battery in accordance with the present invention.

Referring to FIG. 10, the coulombic efficiency means the ratio of the number of charges entering the electrode to the number of charges extracted from the electrode. In the case of the SWA, the coulombic efficiency at the first cycle is about 77.5%, from which it can be seen that the SWA has improved reversibility in the electrochemical reaction. Moreover, the SWA shows the largest capacity and reversibility, which indicates that the active Si is effectively integrated compared to the SPA or STF. Within five cycles, the silicon electrodes with the nanostructures (SWA and SPA) show the highest coulombic efficiency of more than 99%, from which it can be seen that the silicon thin film with the nanostructures has improved reversibility. Further, in the case of the silicon electrode with the nanostructures having the improved capacity retention, the coulombic efficiency is enhanced, and thus the stability can be ensured even in greater numbers of charge/discharge cycles.

Figure 11:
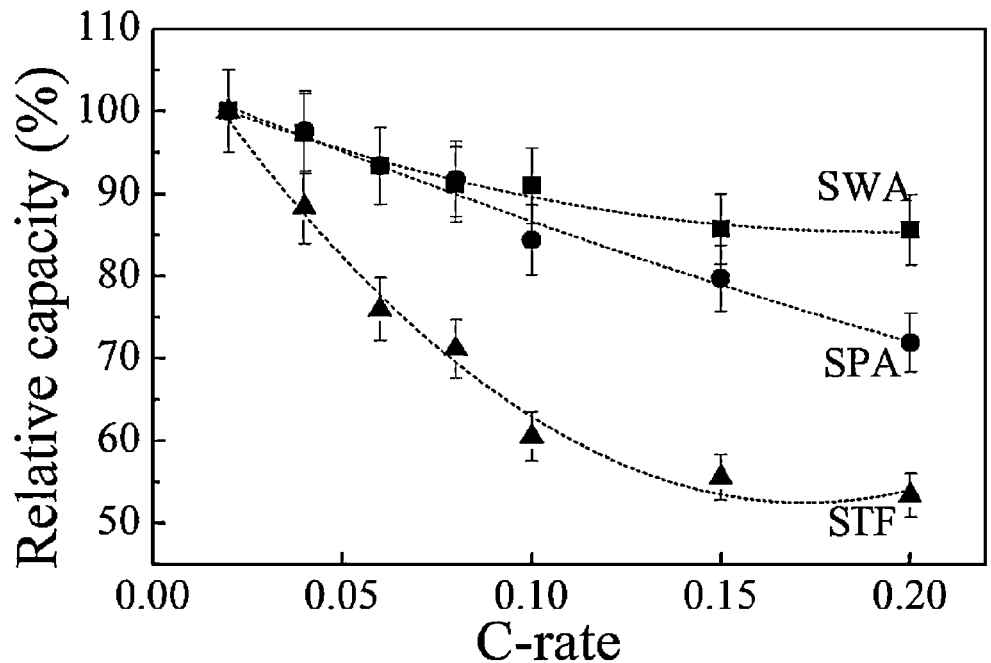
FIG. 11 is a graph showing the relative capacity at different C rates of the electrode for a battery in accordance with the present invention.

FIG. 11 is a graph showing the relative capacity at different C rates of the electrode for a battery in accordance with the present invention.

Referring to FIG. 11, comparing the discharge capacity at 0.2C rate, the silicon electrodes (SWA and SPA) with the nanostructures preserve 80% of the capacity at 0.02C rate. In contrast, the capacity of the bulk silicon electrode (STF) rapidly decreases to about 53% by the increase in the input current density to 0.2C rate. The silicon electrode with the nanostructures serves to cause Li-ion diffusion of the electrolyte in an open space between adjacent nanostructures during electrochemical reaction, thereby ensuring an enlarged active site. Therefore, the silicon electrode with the nanostructures may be useful for high-power applications when the battery is discharged or charged at high current.

Figure 12A:
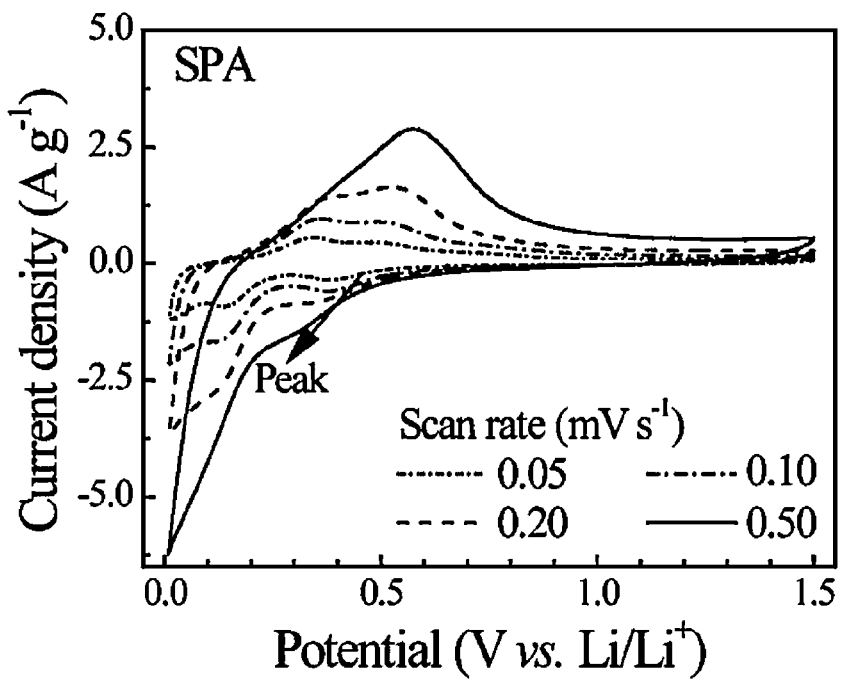
FIGS. 12A to 12C are graphs showing the current density at different potentials for the electrode in accordance with the comparative example and the electrode in accordance with the present invention.
Figure 12B:
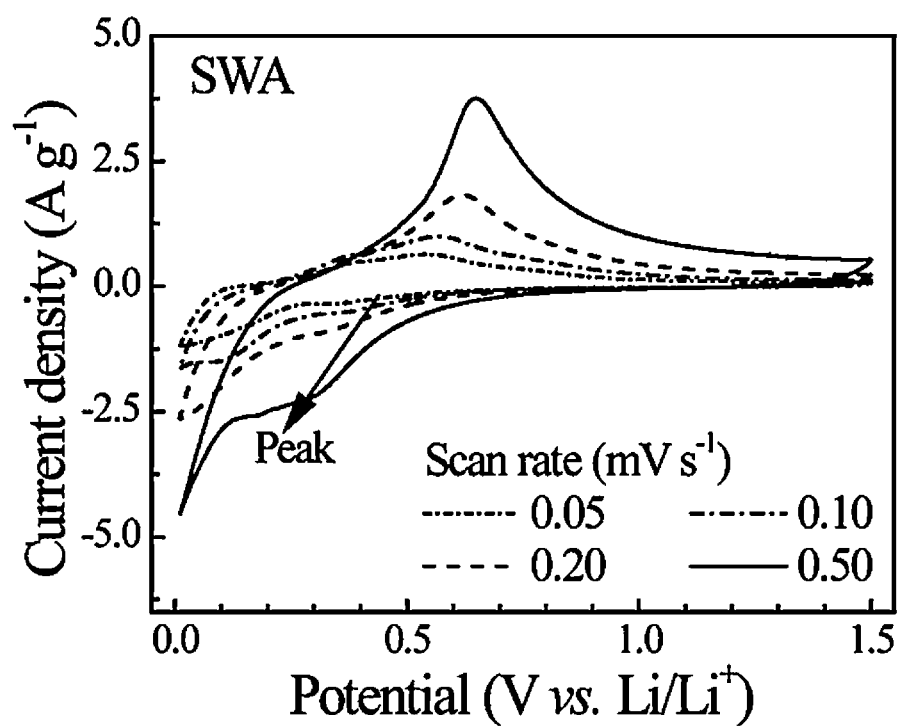
Figure 12C:
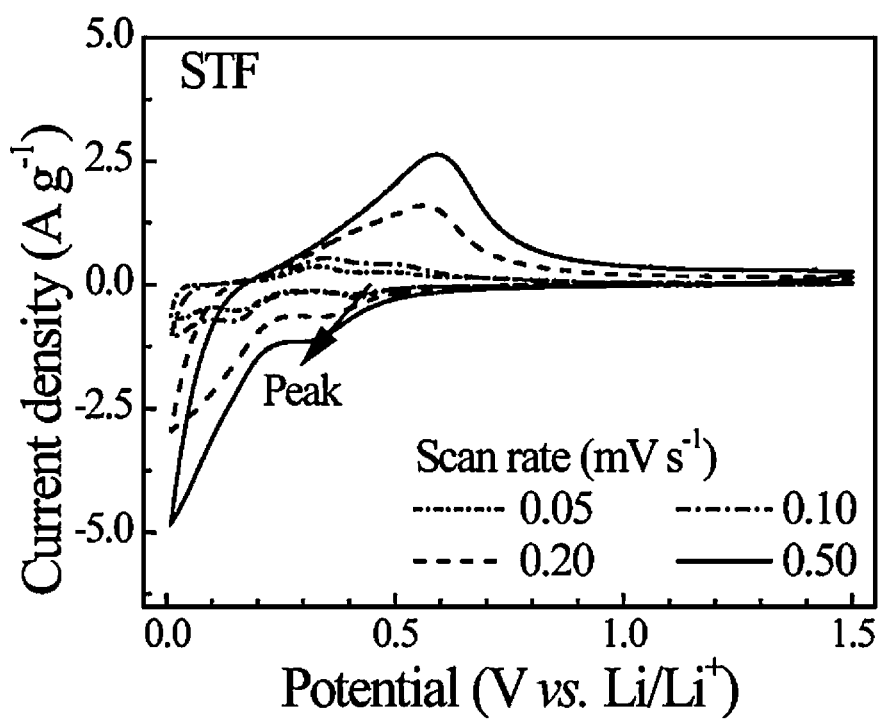
Figure 13:
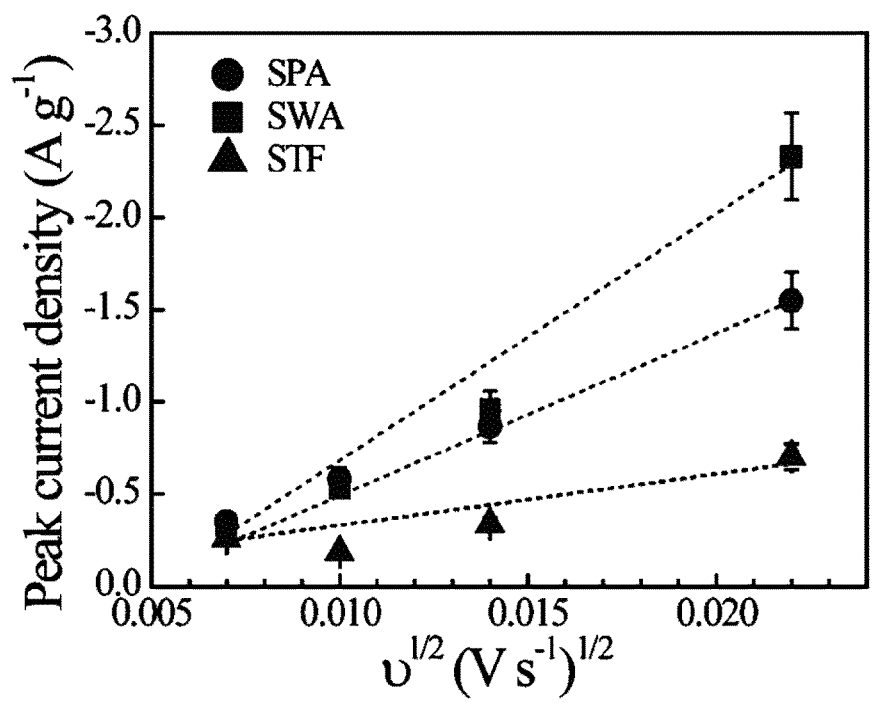
FIG. 13 is a graph showing the peak current density at different scan rates of the electrode for a battery in accordance with the present invention.

FIGS. 12A to 12C are graphs showing the current density at different potentials for the electrode in accordance with the comparative example and the electrode in accordance with the present invention, and FIG. 13 is a graph showing the peak current density at different scan rates of the electrode for a battery in accordance with the present invention.

The current density at different potentials of the electrodes was measured at different scan rates from 0.05 from 0.05 mV s$^{-1}$ to 0.5 mV s$^{-1}$ by cyclic voltammetry.

Referring to FIGS. 12A to 12C, the rate-determining steps of the electrochemical reaction change from surface reactions to semi-infinite solid-state diffusion of Li ions. During semi-infinite diffusion, the peak current is proportional to the square root of the scan rate.

Referring to FIG. 13, it can be seen that the peak current at different scan rates is proportional to the square root of the scan rate, which indicates that the reaction kinetics are controlled by the semi-infinite diffusion of Li ions. The peak currents at the cathode and the anode increase with increasing potential scan rate. The Li diffusion coefficient is determined by the following peak current equation:

$$I_p = (2.69 \times 10^5) n^{3/2} A D^{1/2} C_0 u^{1/2}$$

where n is the number of electrons transferred per Li$^+$, $I_p$ is the peak current (A), A is the surface area of the electrode (cm$^2$), D is the diffusion coefficient of Li$^+$ (cm$^2$ s$^{-1}$), $C_0$ is the bulk concentration of Li$^+$, and u is the scan rate (V s$^{-1}$).

The surface areas of SPA and SWA were calculated to be 3.48 cm$^2$, respectively, while that of STF was 1.77 cm$^2$. As shown in FIG. 10D, the SPA and SWA have steeper slopes than the STF. The SWA has a diffusion coefficient of $5.9 \times 10^{-9}$ cm$^2$ s$^{-1}$, which is approximately four times higher than that of the STF ($1.6 \times 10^{-9}$ cm$^2$ s$^{-1}$) The diffusion coefficient of the SPA is $1.3 \times 10^{-9}$ cm$^2$ s$^{-1}$ which is similar to that of the STF. This indicates that the electrode performance of the SPA shows insignificant improvement over that of the STF, despite the enlarged active sites. Therefore, it can be seen that the improved SPA performance is related to the reduced diffusion length of Li ions and the decrease in resistance. The formation of the nanostructures can change the effective thickness of the silicon thin film.

It can be seen that the SPA shows an analogous behavior to the thin film structure having a decreased film thickness, while the SWA exhibits the different features from the others with the nanostructure effects in light of electrochemical characteristics such as irreversible capacity, internal resistance, overpotential, and lithium ion diffusion coefficient.

Figure 14A:
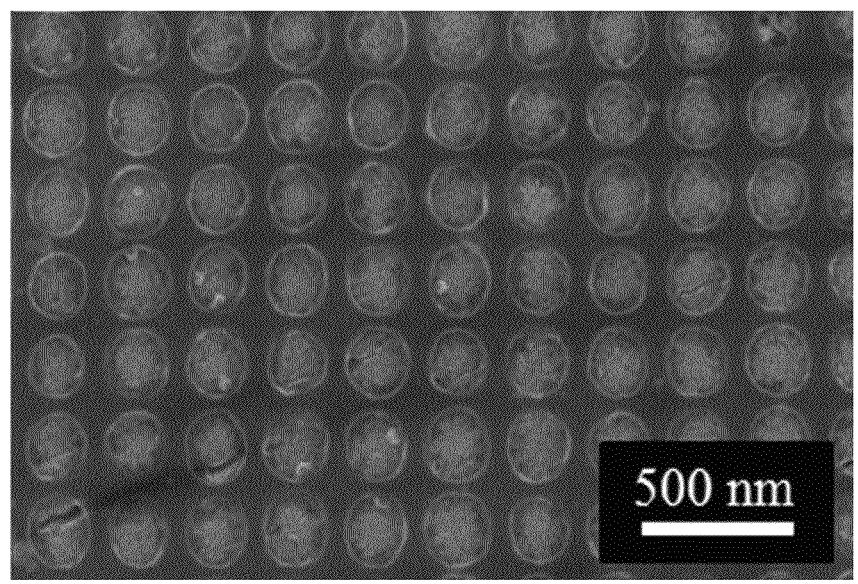
FIGS. 14A to 14C show SEM images of the surface of the electrode in accordance with the comparative example and the electrode in accordance with the present invention after the 30th charge/discharge cycle.
Figure 14B:
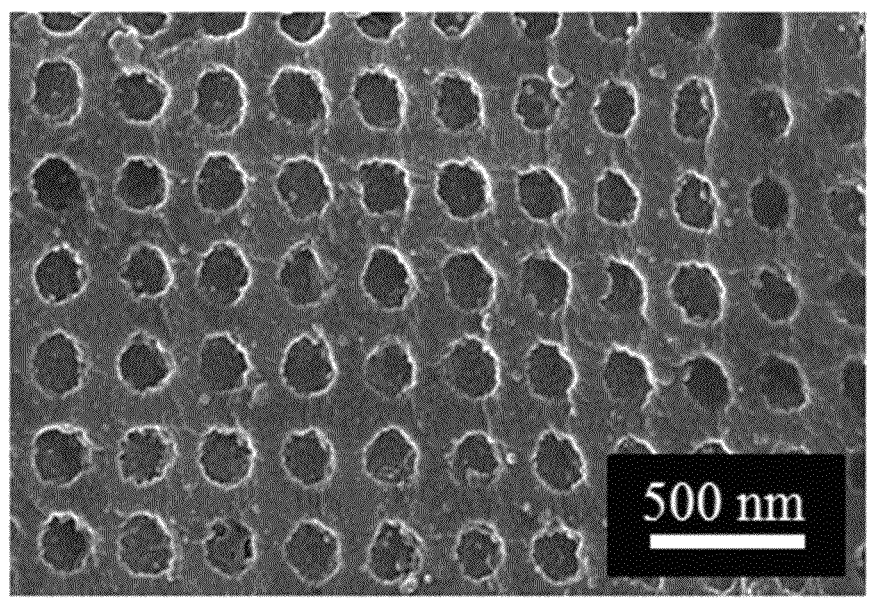
Figure 14C:
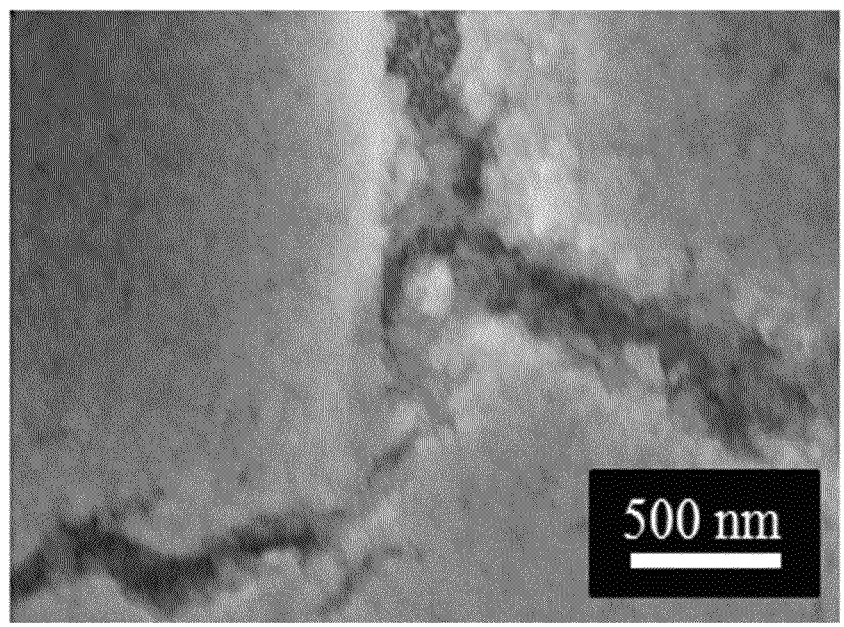

FIGS. 14A to 14C show SEM images of the surface of the electrode in accordance with the comparative example and the electrode in accordance with the present invention after the 30th charge/discharge cycle. FIG. 14A shows an SEM image of the SPA, FIG. 14B shows an SEM image of the SWA, and FIG. 14C shows an SEM image of the STF.

Referring to FIGS. 14A to 14C, it can be seen that the silicon electrodes with the nanostructures (SPA and SWA) remain relatively stable with a few cracks and delamination appearing in the surface region, whereas the STF shows serious pulverization from the substrate. In the case of the STF, the repetitive aggregation, pulverization, and large volume expansions/contractions result in the formation of a large cracked surface. The capacity retention of the STF is unstable and subject to prolonged degradation.

Accordingly, part of the active Si is detached from the current collector, resulting in a rapid fading of the capacity. On the contrary, in the case of the silicon electrode with the nanostructures, the structural stress is reduced, thereby alleviating the cracking and crumbling of the silicon electrode. This capability may be responsible for the better reversible capacity performance in the Li-ion battery. Moreover, the number of active sites increases during Li—Si alloying/dealloying, and thus the internal resistance is reduced. Furthermore, the extended surface area reduces the volume change during charge/discharge cycles, thereby contributing to the facile stress relaxation. The extended surface area and nanocavities formed therein provide extra contact area to the electrolyte, thereby facilitating the transport of lithium ions. In addition, the silicon electrodes with the nanostructures exhibit improved capacity retention even during repeated charge/discharge cycles.

As described above, the electrode for a battery according to the present invention comprising the silicon nanostructures integrally formed on the silicon thin film and having a period array can reduce the internal resistance, have better charge transport properties, and reduce the structural stress, thereby exhibiting high storage capacity, high efficiency charge/discharge characteristics, and long charge/discharge cycle characteristics.

Moreover, the method for manufacturing the electrode for a battery according to the present invention can simply and easily form a nanopattern with nanostructures on a silicon thin film using laser interference lithography (LIL) and dry etching.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An electrode for a battery, the electrode comprising:
a silicon thin film; and
silicon nanostructures integrally formed on the top of the silicon thin film and having a periodic array,
wherein the silicon nanostructures have a symmetric array structure comprising a plurality of periodically arrayed silicon pillars or a plurality of periodically formed silicon wells.

2. The electrode of claim 1, wherein the silicon nanostructures have a 4-fold symmetric array structure, in which the diameter of each of the plurality of periodically arrayed silicon pillars or that of each of the plurality of periodically formed silicon wells is the same as the distance between adjacent silicon pillars or silicon wells.

3. The electrode of claim 1, wherein the distance between adjacent silicon pillars or silicon wells is 10 to 300 nm.

4. The electrode of claim 1, wherein the diameter of the silicon pillar or silicon well is 10 to 300 nm.

5. The electrode of claim 1, wherein the height of the silicon pillar or the depth of the silicon well is 50 to 1,000 nm.

6. A lithium secondary battery comprising the electrode of claim 1.

7. A method for manufacturing an electrode for a battery, the method comprising:
forming a photoresist layer on a silicon thin film formed on a substrate;
exposing the photoresist layer to light;
forming a photoresist pattern by developing the exposed photoresist layer; and
forming nanostructures on the silicon thin film by etching the silicon thin film using the photoresist pattern as a mask,
wherein the exposing of the photoresist layer to light is performed by laser interference lithography,
wherein the exposing of the photoresist layer to light is performed for the exposed photoresist layer to have a symmetric array pattern of structure.

8. The method of claim 7, further comprising, before forming the photoresist layer, an adhesion promoter layer on the silicon thin film.

9. The method of claim 7, wherein the exposing of the photoresist layer to light is performed twice for the exposed photoresist layer to have a 4-fold symmetric array pattern of structure.

10. The method of claim 7, wherein the etching is performed by dry etching.

* * * * *